Patented Nov. 18, 1952

2,618,595

UNITED STATES PATENT OFFICE 2,618,595

WELL DRILLING COMPOSITION

Walter E. Gloor, Wilmington, Del., assignor to Hercules Powder Company, Wilmington, Del., a corporation of Delaware No Drawing. Application April 5, 1949,
Serial No. 85,727

4 Claims. (Cl. 252—8.5)

This invention relates in general to an oil well drilling mud and, in particular, relates to a water base or emulsion base oil well drilling mud or the like containing a carboxymethyl hydroxyethyl cellulose or salt thereof.

In the rotary drilling of oil wells, it is common practice to employ a drilling mud which is circulated through the hollow drill pipe and over the cutting edges of the drill. The principal purposes of the drilling mud are to remove cuttings from the hole, maintaining them in a state of suspension during operation and whenever drilling is temporarily halted; to form a thin, impervious, tough wall in the hole, which prevents caving or scaling of the wall and likewise prevents loss of water from the hole; to provide hydrostatic pressure, preventing gases and liquids from the surrounding strata from entering the hole; and to act as a cooling medium for the drill. In order to perform these functions satisfactorily, the drilling mud must have certain characteristics varying, of course, with the type of formation being drilled, but nevertheless, generally similar. Thus, for example, a relatively low viscosity is required to permit a satisfactory rate of circulation with the consequent quick removal of cuttings from the drilling edge and simultaneous cooling of the drill. At the same time, however, the viscosity must be sufficiently high to maintain the cuttings in suspension and carry them away from the work zone and the mud, furthermore, should be thixotropic, to prevent settling of the cuttings when drilling is temporarily halted. Another characteristic of the drilling mud which is essential for satisfactory operation is that it retain its favorable properties, and particularly its optimum viscosity, throughout the drilling operation, regardless of the nature of impurities which are rapidly acquired from the formations being drilled and thus, since there are frequent occasions for drilling through formations containing sodium, magnesium, iron, calcium compounds, or the like, the drilling mud should be stable with respect to large quantities of these compounds and, particularly, water-soluble compounds of this type. And, of course, all these properties must be possessed and retained while filter loss, or loss through the wall of the drilled well, is held to a minimum.

Now in accordance with the present invention, a carboxymethyl hydroxyethyl cellulose ether which may be prepared, for example, by treating cellulose with a hydroxyethylating agent and with a carboxymethylating agent is incorporated in a small quantity in an aqueous suspension of clay ingredients such as clay and other materials. The highly satisfactory improvements in drilling muds have been obtained increasingly through the use of an increasing amount of the substantially water-soluble carboxymethyl hydroxyethyl cellulose or its appropriate salt, preferably employing the cellulose derivative in the order of about ¼ to about 4% of the total composition and usually about 1 to 1½%. The drilling mud thus produced is characterized by valuable properties, and particularly is characterized by maintaining these favorable properties in the presence of contaminating compounds and when used in conjunction with various types of clays and other drilling mud components.

In order to evaluate the drilling muds prepared through the incorporation of carboxymethyl hydroxyethyl cellulose, there were employed standard tests recommended by the American Petroleum Institute (Recommended Practice on Standard Field Procedure for Testing Drilling Fluids, API Code No. 29, 2nd ed., July 1942). Particular test methods employed were density, viscosity, gel strength immediately after stirring, gel strength on standing for 10 minutes, and filtration and wall building properties.

In the use of this invention, the carboxymethyl hydroxyethyl cellulose has been, and may be, added to conventional drilling mud constituents including, for example, clays, viscosity control agents, weighting materials, and the like, as generally employed in the formulation of drilling muds.

The general nature of the invention having been set forth and the general procedures having been defined, the following examples are cited as specific illustrations of the invention, but not in limitation thereof.

EXAMPLE 1

To a vigorously stirred slurry of 30 parts by weight of cotton linters in 750 parts by volume of 87% isopropanol was added 24 parts by weight of 50% sodium hydroxide dropwise over a period of 17 mintues at room temperature. After 30 minutes of additional stirring, there was added to the mixture 8.9 parts by weight of ethylene oxide in 50 parts by volume of anhydrous isopropanol. While the stirring was continued, the temperature was then raised to 70° C. and was maintained between 68° and 73° C. for a period of one hour. A solution of 35 parts by weight of monochloracetic acid dissolved in 35 parts by volume of anhydrous isopropanol was added to the mixture over a period of 15 minutes. The stirring was then continued for an additional 2 hours and 10 minutes after which the heating was stopped and the product allowed to stand for 18 hours at room temperature.

A substantially water-soluble mixed cellulose ether was recovered from the reaction product as follows. The reaction liquor was drained off and the fibrous product was stirred in 70% methanol neutralized to phenol phthalein with acetic acid and was washed free of salts with 70% methanol. The fibrous product was then dehydrated with an anhydrous methanol and dried at 70° C. There resulted a carboxymethyl hydroxyethyl cellulose having a hydroxyethyl substitution of 0.22 and a carboxymethyl substitution of 0.62. A 2% aqueous solution of the product was fiber-free and clear.

A drilling mud was prepared employing a commercial West Texas clay which is resistant to the effect of salt and which is known to the trade as "Ez Mix" and also employing a small amount of Wyoming-type bentonite which is characterized by being readily dispersible in water. These materials were prepared in the form of a drilling mud together with controlled amounts of water, barium sulfate and calcium sulfate. Specifically, a drilling mud was prepared by mixing together 6.9 parts Ez Mix, 0.69 part bentonite, 0.17 part calcium sulfate, 25 parts barium sulfate and 67.24 parts water, and to the thus-prepared mixture was added 1% of the carboxymethyl hydroxyethyl cellulose prepared according to the above procedure. The drilling mud was characterized by favorable viscosity and gel strength properties and favorable filtration and wall building properties and by maintaining these properties in the presence of ionic impurities. It was a satisfactory oil well drilling mud.

EXAMPLE 2

For the purpose of comparative data, there were prepared three types of drilling muds with a basic composition as indicated below, using the clay and bentonite of Example 1.

|  | Formula | | |
|---|---|---|---|
|  | A | B | C |
|  | Percent | Percent | Percent |
| Clay | 6.90 | 6.08 | 6.08 |
| Bentonite | .69 | .61 | .61 |
| Calcium sulfate | .17 | .15 | .15 |
| Barium sulfate | 25.00 | 21.98 | 21.98 |
| Sodium chloride |  | 12.00 |  |
| Calcium chloride |  |  | 12.00 |
| Water | 67.24 | 59.18 | 59.18 |

To these formulations were added carboxymethyl hydroxyethyl cellulose mixed ethers prepared according to the procedure of Example 1 and characterized as follows: A carboxymethyl hydroxyethyl cellulose having a hydroxyethyl substitution of 0.18 hydroxyethyl groups per anhydro glucose unit and 0.42 carboxymethyl groups per anhydro glucose unit, having a solution viscosity of 26,800 cps. in 6% aqueous solution, and identified in Table 1 as CMHEC (I), a carboxymethyl hydroxyethyl cellulose having a hydroxyethyl substitution of 0.73 and a carboxymethyl substitution of 0.354, having a solution viscosity of 7190 cps. in 6% aqueous solution, and identified as CMHEC (II); a carboxymethyl hydroxyethyl cellulose having a hydroxyethyl substitution of 0.73 and a carboxymethyl substitution of 0.87, having a solution viscosity of 379 cps. in 6% aqueous solution, and identified as CMHEC (III); and a carboxymethyl hydroxyethyl cellulose having a hydroxyethyl substitution of 0.15 and a carboxymethyl substitution of 0.39, having a solution viscosity of 10,330 cps. in 4% aqueous solution, and identified in Table 1 as CMHEC (IV). The results of the tests previously described as applied to these muds are set forth in the table, in comparison with results for formulations containing no additive.

Table

| Test composition No. | Drilling mud composition and formulations | Weight (lb./gal.) | Water loss in 30 min. (ml.) | Filter cake Thickness (inches) | Viscosity at 600 R. P. M. Stormer (cps.) | Initial gel strength (grams) | Gel strength in 10 min. (grams) |
|---|---|---|---|---|---|---|---|
| 1 | A | 11.0 | 68.0 | 13/64 | 20 | 28 | 31 |
| 2 | A, with 1% CMHEC (I) | 11.0 | 4.8 | 3/64 | 56 | 5 | 4 |
| 3 | A, with 1% CMHEC (II) | 11.3 | 4.8 | 2/64 | 28 | 5 | 5 |
| 4 | A, with 1% CMHEC (III) | 11.3 | 3.4 | 3/64 | 45 | 6 | 8 |
| 5 | A, with 1% CMHEC (IV) | 11.1 | 6.2 | 2/64 | 87 | 21 | 115 |
| 6 | B (contains sodium chloride) | 11.7 | 72.0 | 11/64 | 17 | 18 | 24 |
| 7 | B, with 1% CMHEC (I) | 11.7 | 7.6 | 4/64 | 37 | 5 | 5 |
| 8 | B, with 1% CMHEC (IV) | 11.8 | 8.4 | 3/64 | 35 | 5 | 8 |
| 9 | B, with 1½% CMHEC (I) | 11.8 | 4.4 | 1/64 | 127 | 18 | 77 |
| 10 | C (contains calcium chloride) | 11.9 | 76.0 | 11/64 | 15 | 16 | 23 |
| 11 | C, with 1% CMHEC (I) | 11.4 | 4.2 | 1/64 | 47 | 4 | 6 |
| 12 | C, with 1% CMHEC (II) | 11.8 | 3.2 | 1/64 | 61 | 12 | 13 |
| 13 | C, with 1% CMHEC (III) | 12.0 | 4.4 | 2/64 | 28 | 4 | 8 |
| 14 | C, with 1% CMHEC (IV) | 12.1 | 10.6 | 9/64 | 30 | 6 | 8 |

In evaluating the data in the table, it was generally considered that a water loss of less than about 10 ml. in 30 minutes is critically necessary and that below 10 ml. in 30 minutes a smaller loss is increasingly more satisfactory; that a preferred viscosity is somewhat higher than the viscosity of the mud containing no cellulose derivative and that a viscosity as high as about 75 cps. was satisfactory; that the initial gel strength should be not higher than about 10 grams, and that the gel strength in 10 minutes should be not higher than about 30 grams, not significantly lower than about 10 grams and certainly not below about 5 grams. Applying these criteria to the drilling muds containing the carboxymethyl hydroxyethyl cellulose, the conclusion is generally stated that these drilling muds are satisfactory. In particular, it is noted that the extremely important property of viscosity as imparted by the carboxymethyl hydroxyethyl cellulose is highly satisfactory in that the viscosity of the drilling mud is improved not only in the absence of salt and calcium contaminants, but also in that a drilling mud containing even large quantities of sodium chloride or calcium chloride still has its viscosity greatly improved through the use of carboxymethyl hydroxyethyl cellulose. It is also noted that the use of a slightly larger amount of the carboxymethyl hydroxyethyl cellulose such as, for example, 1½%, permits the formation of a relatively high viscosity drilling mud even in the presence of extremely large quantities of salt contaminants, it being understood that in certain instances an increased viscosity may be desirable.

With reference to the gel strength of the compositions, it is noted that the strength is substantially satisfactory for a drilling mud containing carboxymethyl hydroxyethyl cellulose and, particularly, that the gel strength is not seriously impaired by the presence of salt contaminants. With reference to the test compositions set forth in Table 1, it is noted that each and every one of the carboxymethyl hydroxyethyl cellulose materials may be usefully employed to produce a drilling mud with desirable gel characteristics.

In comparative tests, Formulas A, B, and C were prepared and mixed with 1% sodium carboxymethylcellulose, employing a commercial product with a substitution of about 0.7 carboxymethyl groups per anhydro glucose unit. The significant test results on these compositions containing 1% carboxymethylcellulose were (Formula A) water loss 5.0 ml. per 30 min.; viscosity, 45 cps.; initial gel strength, 5 gms.; 10 minute gel strength, 11 gms.; (Formula B) water loss 5.4 ml. per 30 min.; viscosity, 19 cps.; initial gel strength, 3 gms.; 10 minute gel strength, 7 gms.; and (Formula C) water loss 9.2 ml. per 30 min.; viscosity, 17 gms.; initial gel strength, 4 gms.; 10 minute gel strength, 4 gms. Thus, the compositions containing carboxymethyl hydroxyethyl cellulose compare favorably in various properties with the compositions containing a typical cellulose derivative such as carboxymethylcellulose: particularly, the viscosity and water loss of drilling muds B and C, containing large quantities of sodium and calcium chlorides, were improved to a significantly greater degree through the addition of the preferred carboxymethyl hydroxyethyl cellulose than through the addition of carboxymethylcellulose.

What I claim and desire to protect by Letters Patent is:

1. An aqueous well drilling mud containing a small quantity of a substantially water-soluble carboxymethyl hydroxyethyl cellulose having between about 0.35 and about 0.88 carboxymethyl group and between about 0.15 and about 0.73 hydroxyethyl group per anhydroglucose unit in the cellulose in an amount sufficient to improve the viscosity, resistance to water loss, and gel characteristics of said mud, and to maintain the aforesaid improved properties in the presence of alkali and alkaline earth metal salts acquired by said mud during drilling operations.

2. An aqueous well drilling mud containing a substantially water-soluble carboxymethyl hydroxyethyl cellulose having between about 0.35 and about 0.88 carboxymethyl group and between about 0.15 and about 0.73 hydroxyethyl group per anhydroglucose unit in the cellulose in an amount of about ¼ to about 4% of the total composition, said mud having improved viscosity, resistance to water loss, and gel characteristics and being characterized by retention of the aforesaid improved properties in the presence of alkali and alkaline earth metal salts acquired by the mud during drilling operations.

3. An aqueous well drilling mud containing a substantially water-soluble carboxymethyl hydroxyethyl cellulose having between about 0.35 and about 0.88 carboxymethyl group and between about 0.15 and about 0.73 hydroxyethyl group per anhydroglucose unit in the cellulose in an amount of about 1 to about 1½% of the total composition, said mud having improved viscosity, resistance to water loss, and gel characteristics and being characterized by retention of the aforesaid improved properties in the presence of alkali and alkaline earth metal salts acquired by the mud during drilling operations.

4. An aqueous well drilling mud comprising water containing sufficient clay material to form a filter cake on the wall of the well and a small quantity of a substantially water-soluble carboxymethyl hydroxyethyl cellulose having between about 0.35 and about 0.88 carboxymethyl group and between about 0.15 and about 0.73 hydroxyethyl group per anhydroglucose unit in the cellulose in an amount sufficient to improve the viscosity, resistance to water loss, and gel characteristics of said mud, and to maintain the aforesaid improved properties in the presence of alkali and alkaline earth metal salts acquired by said mud during drilling operations.

WALTER E. GLOOR.

REFERENCES CITED

The following references are of record in the file of this patent:

UNITED STATES PATENTS

| Number | Name | Date |
|---|---|---|
| 2,425,768 | Wagner | Aug. 19, 1947 |
| 2,468,792 | Wagner et al | May 3, 1949 |
| 2,476,331 | Swinehart et al. | July 19, 1949 |
| 2,510,153 | Swinehart | June 6, 1950 |
| 2,570,947 | Himel et al. | Oct. 9, 1951 |